(12) United States Patent
Ryhman

(10) Patent No.: US 7,552,947 B2
(45) Date of Patent: Jun. 30, 2009

(54) DEVICE FOR CONNECTING TWO RIGID TUBULAR OBJECTS COMPRISING A MALE PART AND A FEMALE PART

(75) Inventor: Morgan Ryhman, Anderstorp (SE)

(73) Assignee: Norma Sweden AB, Stockholm (SE)

( * ) Notice: Subject to any disclaimer, the term of this patent is extended or adjusted under 35 U.S.C. 154(b) by 0 days.

(21) Appl. No.: 10/579,092

(22) PCT Filed: Nov. 4, 2004

(86) PCT No.: PCT/SE2004/001595

§ 371 (c)(1),
(2), (4) Date: Dec. 31, 2007

(87) PCT Pub. No.: WO2005/047753

PCT Pub. Date: May 26, 2005

(65) Prior Publication Data

US 2008/0157520 A1 Jul. 3, 2008

(30) Foreign Application Priority Data

Nov. 14, 2003 (SE) .................................. 0303016

(51) Int. Cl.
*F16L 37/00* (2006.01)

(52) U.S. Cl. .................... 285/308; 285/314; 285/319
(58) Field of Classification Search ................. 285/308, 285/314, 319, 322
See application file for complete search history.

(56) References Cited

U.S. PATENT DOCUMENTS 2,869,099 A * 1/1959 Robinson .................... 285/319
4,696,497 A * 9/1987 Schwarzensteiner ........ 285/319

(Continued)

FOREIGN PATENT DOCUMENTS

SE 512411 3/2000

OTHER PUBLICATIONS

International Search Report (PCT/ISA/210).

*Primary Examiner*—David E Bochna
(74) *Attorney, Agent, or Firm*—Harness, Dickey & Pierce, P.L.C.

(57) ABSTRACT

A device is disclosed for connecting two rigid tubular objects. The device includes a male part and a female part. The female part includes a sleeve which, at one of its ends, is provided with a recess. The male part includes a tube portion which, at one of its ends, is provided with a transverse edge formed by an indentation arranged in the outer wall of the male part. A sleeve-shaped element is arranged to be placed between the parts when inserting the male part into the female part. The element is provided with a resilient tongue with a first device/element which, during insertion of the element into the female part, resiliently engages the recess thereof and a second device/element, which during insertion of the male part into the element, resiliently snaps into place behind the transverse edge of the male part. The resilient tongue allows separation of the female part and the male part by turning of the element relative to the male part to a position where the second device/element of the resilient tongue is arranged radially outside the transverse edge of the male part. The resilient tongue is, in turning for separation, with a portion in the recess of the female part raised radially outside the transverse edge of the male part.

10 Claims, 3 Drawing Sheets

U.S. PATENT DOCUMENTS

| | | | |
|---|---|---|---|
| 5,462,311 A * | 10/1995 | Cipolla | 285/302 |
| 5,511,827 A | 4/1996 | Steinkamp et al. | |
| 5,607,190 A * | 3/1997 | Exandier et al. | 285/308 |
| 5,704,658 A * | 1/1998 | Tozaki et al. | 285/321 |
| 6,199,920 B1 | 3/2001 | Neustadtl | |
| 6,260,889 B1 * | 7/2001 | Tozaki et al. | 285/321 |
| 6,467,817 B1 * | 10/2002 | Rhyman | 285/319 |
| 6,971,679 B2 * | 12/2005 | Legeay | 285/319 |

* cited by examiner

DEVICE FOR CONNECTING TWO RIGID TUBULAR OBJECTS COMPRISING A MALE PART AND A FEMALE PART

FIELD OF THE INVENTION

The present invention relates to a device for connecting two rigid tubular objects, comprising a male part and a female part, which are interconnectable. The female part consists of a sleeve which at one of its ends is connected to or constitutes an integral part of one of said objects and which at its other end is provided with at least one recess. The male part consists of a tube portion which at one of its ends is connected to or constitutes an integral part of the other of said objects and at its other end in its outer wall is provided with a transverse edge which is formed by an indentation arranged in the outer wall of the male part. A sleeve-shaped element is arranged to be placed between the parts when inserting the male part into the female part. The element is provided with at least one resilient tongue with a first means which is arranged to resiliently engage the recess of the female part when inserting the element into the female part, and a second means which is arranged to resiliently snap into place behind the transverse edge of the male part when inserting the male part into the element.

BACKGROUND ART

A device for interconnecting two rigid tubular objects of the type stated by way of introduction is known from SE 512,411 (WO 00/09934). This device can be used to interconnect two rigid objects, such as two tubes that are made of a rigid, non-elastic material.

SUMMARY OF THE INVENTION

The object of the present invention is to provide an alternative coupling device which can be used to interconnect two rigid, preferably tubular, objects, such as two rigid tubes. Another object is to be able to indicate correct interconnection of the objects using a distinct indicator.

According to the invention, this object is achieved by a device of the type stated by way of introduction, which is characterised in that the resilient tongue allows separation of the female part and the male part by turning the element relative to the male part to a position where the second means of the resilient tongue is placed radially outside the transverse edge of the male part, the resilient tongue, in turning for separation, with a portion in the recess in the female part being raised radially outside the transverse edge of the male part.

Additional preferred features of the coupling device according to the invention are stated in the subclaims.

BRIEF DESCRIPTION OF THE FIGURES

The invention will now be described in more detail with reference to the accompanying schematic Figures which by way of example illustrate currently preferred embodiments of the coupling device according to the present invention.

DESCRIPTION OF PREFERRED EMBODIMENTS

Figure 1:
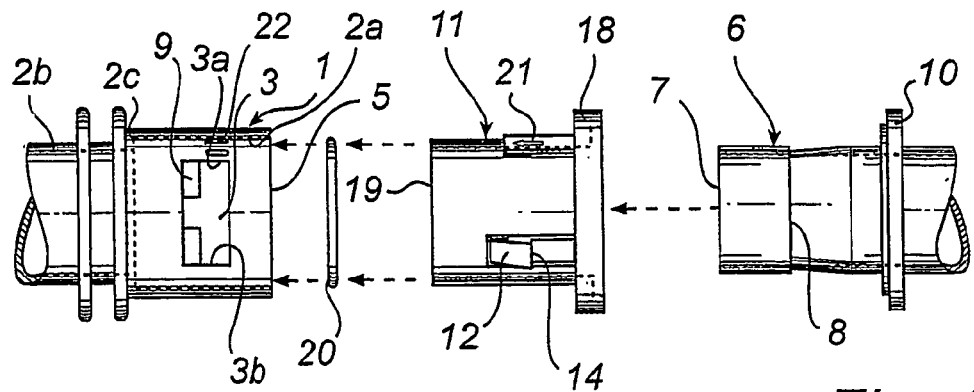
FIG. 1 is an exploded view of the coupling device according to a first embodiment.

According to a preferred embodiment, the coupling device consists of a female part 1, whose main component consists of a sleeve 2, which can be made, for instance, in the form of a tube of a rigid, non-elastic material. As is evident from FIG. 1, the sleeve 2 has at its mouth a mouth portion 2a with an outer and inner diameter larger than the remaining portion 2b of the sleeve, the transition between these two portions being designated 2c. As is evident from FIG. 2A, two diametrically opposite recesses 3, 4 are arranged in the mouth portion of the sleeve at the same distance from the mouth 5 of the sleeve 2. At its end (not shown) opposite the mouth, the female part is provided with, for instance, a threaded portion which is intended to be screwed into a first rigid tube (not shown) or is formed integrally therewith.

The male part 6, see FIG. 1, consists of a tube portion which at one of its ends (not shown) is provided with a threaded portion that is intended to be screwed into a second rigid tube (not shown), which is to be connected to the first tube. Alternatively, the male part may consist of a tube portion which is integrated in a unit such as a cooler. At its other end 7, the male part is provided in its outer wall with a transverse edge 8 which is arranged at a distance from the end surface of the other end 7. This transverse edge may, for instance, be formed by removing material by milling in the outer wall. It may also be formed by pressing the material, milling the material or, if the male part 6 is made of plastic, be formed by injection moulding of the male part. A great advantage of a fully enclosing transverse edge 8 is that the turning angle of the male part relative to the female part or the element is not important when interconnecting the parts. The solution is not conditioned by a stop during insertion, but a means 10 can be arranged as a stop on the male part 6 at a greater distance from the other end 7 than its transverse edge 8. Alternatively, a stopping edge can be arranged in the female part, according to FIG. 2B. In this example, the female part 1 has an inner diameter which is the same as the inner diameter of the male part 6. The device in FIG. 2B is further simplified since it does not have circumferential flanges on the female part 1, like on the female part in FIG. 2A, and also no lug 10 like the male part 6 in FIG. 2A.

As is evident from FIG. 1, a sleeve-shaped element 11 is arranged to be placed between the parts when inserting the male part into the female part, the element being provided with two diametrically opposite resilient tongues 12, 13. As is better seen in FIG. 2A, each resilient tongue is provided with a thickened portion at its free outer end to form a stop lug 14 and 15, respectively, projecting from the outer wall of the element. The stop lugs 14 and 15 are arranged to resiliently engage the recesses 3 and 4 of the female part, respectively, when inserting the element into the female part. The free outer end of each resilient tongue 12 and 13 forms, at its side abutting against the transverse edge 8 of the male part, a stopping edge 16 and 17, respectively, extending inwards from the inner wall of the element. The stopping edges are arranged to resiliently snap into place behind the transverse edge of the male part when inserting the male part into the element 11.

The element is further at one of its outer ends provided with a means 18 which is arranged to abut against the mouth 5 of the sleeve when the resilient tongues and stop lugs, respectively, engage the respective recesses in the female part 1. In order to facilitate the joining of the female part and the element, the element 11 is provided with an indicator 21 adjacent to its means 18 while the female part on its outside is provided with lugs 22, which have a shape matching the indicator 21.

Figure 2A:
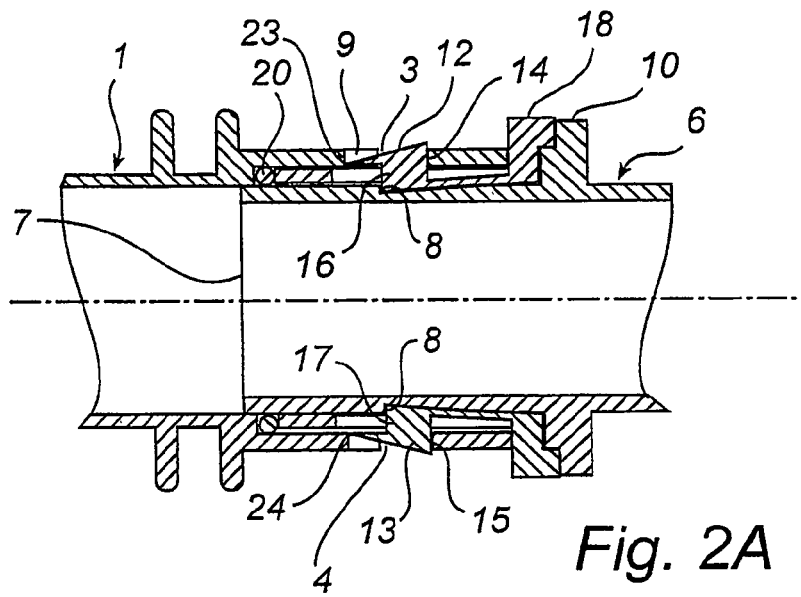
FIG. 2A is a cross-sectional view of the device according to FIG. 1 in a connected state.
Figure 2B:
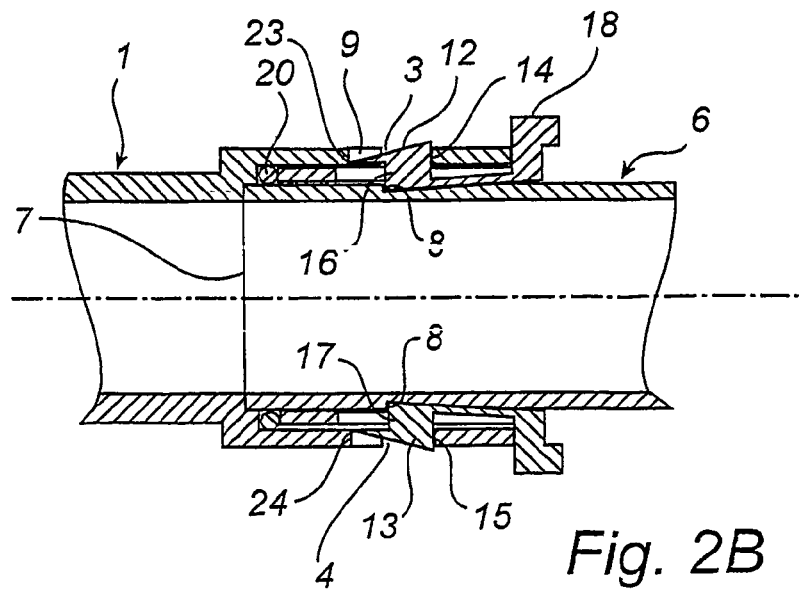
FIG. 2B illustrates an alternative embodiment of the device according to FIG. 2A.

As is further evident from FIG. 2A, the outer diameter of the element 11 is somewhat smaller than the inner diameter of the female part adjacent to the first portion 2a while it exceeds the inner diameter of the remaining portion 2b that corresponds approximately to the inner diameter of the element. As a result, the wall thickness of the element equals approximately half the difference between the mouth portion and the inner diameter of the remaining portion. Moreover, the length of the element between its means 18 and its opposite outer end 19 is somewhat smaller than the length of the mouth portion of the female part, which results in the opposite outer end 19 being positioned a short distance in front of the transition 2c between the first and the remaining portion of the sleeve 2 when the means 18 of the element abuts against the mouth 5 of the sleeve.

An O-ring 20 is further arranged in the transition 2c between the first portion 2a of the sleeve and its remaining portion 2b so as to sealingly abut against the outer wall of the male part 6 in the connected state of the device.

It is also evident from FIG. 2A that the outer diameter of the male part along a portion between its other end 7 and the means 10 is slightly smaller than the inner diameter of both the element and the remaining portion, and that the length of this portion exceeds the length of the first portion 2a of the female part, which results in said other end 7 of the male part extending a distance into the remaining portion 2b of the sleeve past said opposite outer end 19 of the element when the means 10 of the male part abuts against the means 18 of the element.

When the first tube is to be connected to the second tube, the female part 1 and the male part 1 are first attached to the respective tubes unless they are formed as an integral part of the tubes. Then the O-ring 20 is placed in the transition 2c between the mouth portion of the female part and the remaining portion. Subsequently, the element 11 is inserted into the female part 1, its resilient tongues 12 and 13 being placed in such a manner relative to the recesses 3, 4 of the female part that the stop lugs 14, 15 engage the recesses 3, 4 and abut against one lateral edge 3b, see FIG. 1, i.e. in a so-called correct mounting position, and also so that the indicator 21 is positioned between the lugs 22. There will thus be a clear visual indication of the female part and the element being interconnected correctly without the user particularly having to listen for a sound as the stop lugs engage the recesses 3, 4 or having to check the interconnection by trying to once again pull the parts apart. In this correct mounting position, the opposite outer end 19 of the element is positioned close to the O-ring 20 while at the same time its means 18 abuts against the mouth 5 of the female part. Then the male part 6 is inserted into the element 11 with its transverse edge 8 so far that the stopping edges of the resilient tongues snap into place behind the transverse edge of the male part and thus lock the male part to the element, which in turn is locked to the female part. The coupling of the female part 1 and the male part 6 thus constitutes a quick coupling. It is also important to notice that in the present coupling device axial forces arising in connection with use cause a downward turning of the outer end of the resilient tongue towards the male part, which means that the higher the axial force, the better the locking of the resilient tongue to the female and male part.

Figure 3:
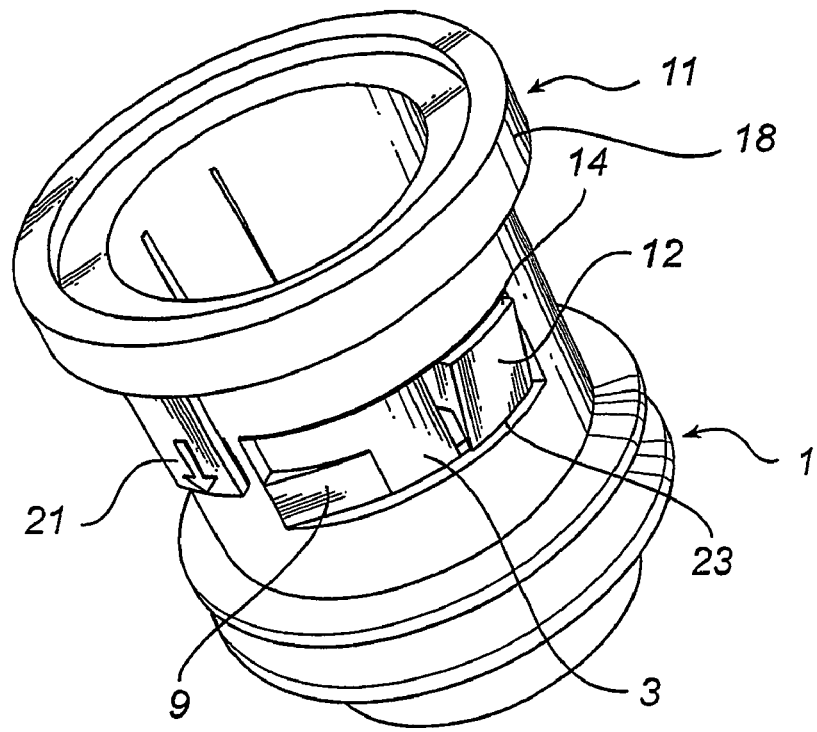
FIG. 3 is a perspective view of the female part and the element in the device according to FIG. 1 in a connected state.

In the design of the resilient tongue as shown in FIG. 2A and the design of the recesses of the female part as shown in FIG. 3, the separation of the male part 6 and the female part 1 may be performed by turning the resilient tongues of the element by its means 18 relative to the male part so far that the stopping edges of the resilient tongues 12, 13 are positioned at the side of the transverse edge 8 of the male part, in which position its stop lugs are positioned at the opposite lateral edge 3a of the recesses. The sloping portions 9, see FIG. 3, in the recesses of the female part raise, in turning of the element, the resilient tongues 12, 13 by the tips 23, 24 of the resilient tongues so that the stopping edges are positioned at the side of the transverse edge 8 of the male part and the male part thus can be pulled out of the female part and the element. It will then be possible to remove the element from the female part by disengaging the resilient tongues from the recesses of the female part by pressing them together after turning back the resilient tongues of the element relative to the female part so that they are positioned at the other lateral edge 3b of the recesses.

Figure 4:
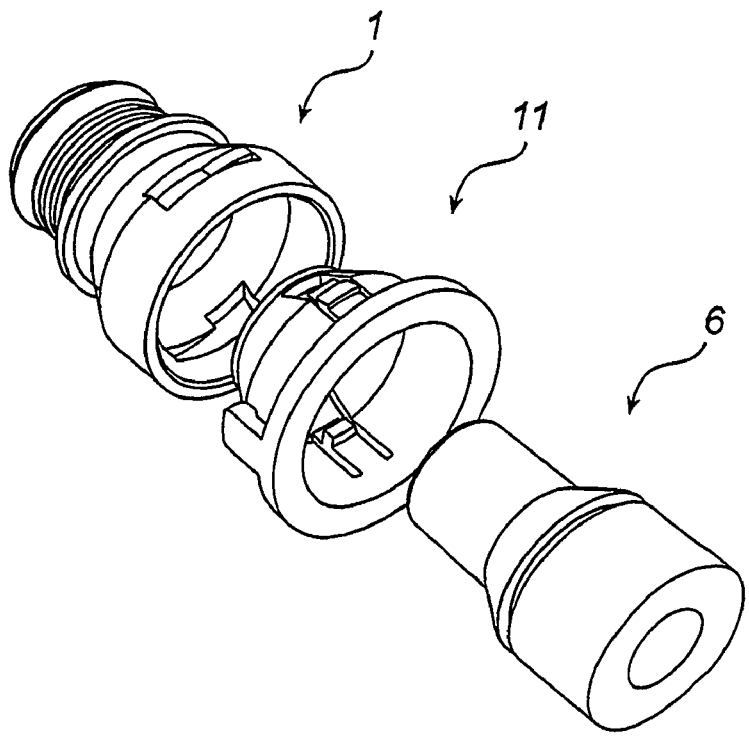
FIG. 4 illustrates an alternative embodiment of the coupling device according to the present invention.

FIG. 4 shows an alternative embodiment of a coupling device according to the invention. The function is the same as in the device in FIGS. 1-3. The difference resides mainly in the design of the male part 6, the element 11 and the female part 1. Above all, the male part 6 differs by a groove with axial limitations in both directions.

Figure 5:
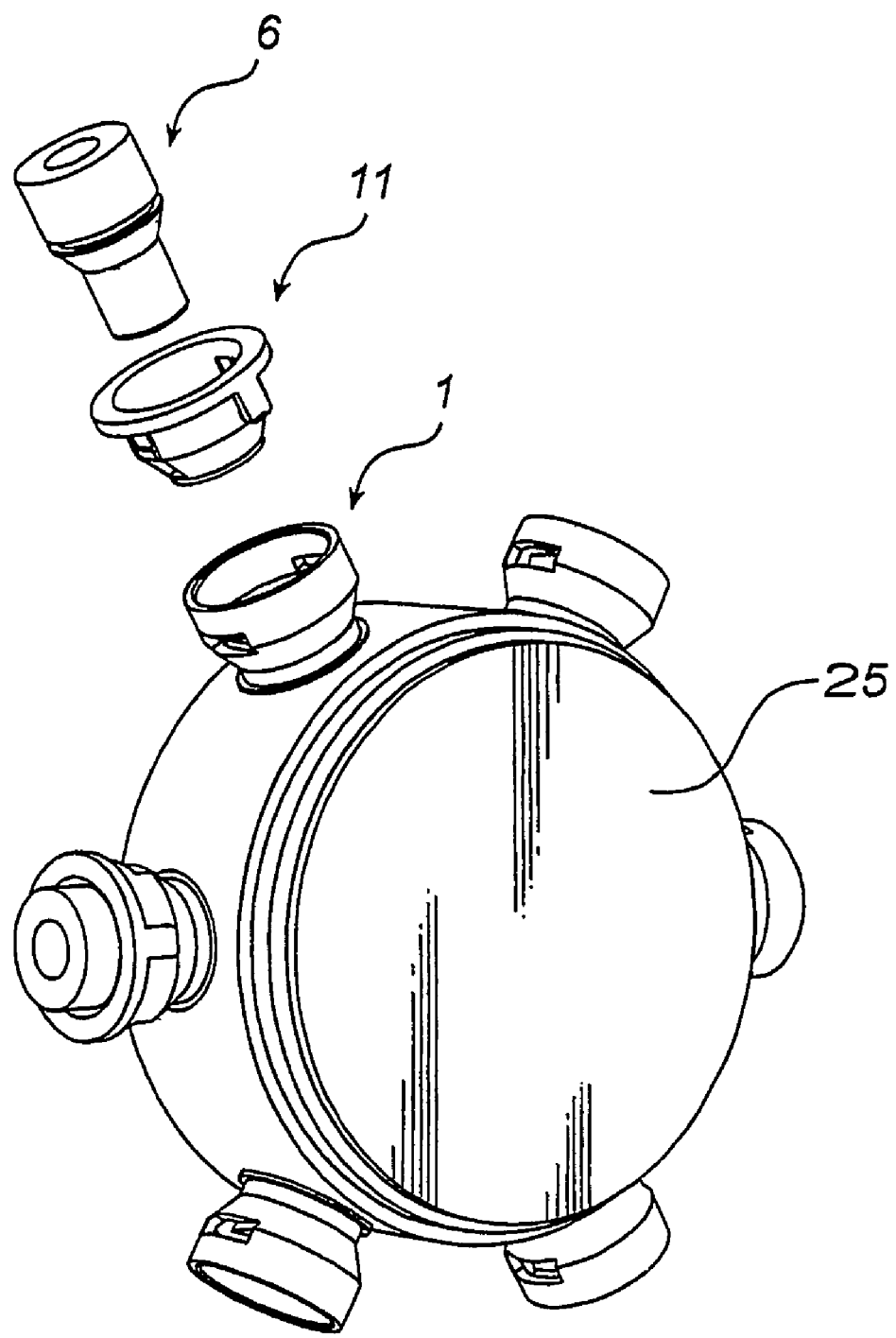
FIG. 5 illustrates a coupling device according to the present invention where the female part constitutes an integral part of a coupling block.

FIG. 5 illustrates a coupling block 25 where the female parts 1 are integrated in the coupling block 25. An element 11 and a male part 6 can thus be connected in the same way as described above.

The invention is not limited to the embodiments shown and described and may be varied in several ways within the scope of the appended claims. For instance, the female part 1 can be provided with one or more, for instance four, recesses instead of two recesses, which in the case involving three recesses are uniformly distributed around the sleeve at the same distance from the mouth 5 of the sleeve, the element 11 being provided with the same number of resilient tongues as the number of recesses, uniformly distributed around the element at the same distance from its means. It is also possible to design the male part and the element without means 10 and 18, respectively, in which case the element must be turned relative to the male part indirectly via the female part. It is also possible, for reasons of security, to arrange two or more O-rings 20 or other sealing elements in the transition 2c between the mouth portion of the sleeve and the remaining portion thereof. It is also possible to design the sloping portions 9 in a manner different from that shown, for example by letting them extend obliquely through the recesses in the female part. Alternatively, the sloping portions can be arranged in the recesses at the side next to the mouth 5 of the female part, the resilient tongues being formed in cross-section in a lying U-shape where the outer flange of the U-shape of the resilient tongue is the portion that slides on the sloping portion and thus raises the resilient tongues when turning the element. Another option is to arrange a groove in the side of the recesses, in which groove the resilient tongue is adapted to run during turning of the element.

The invention claimed is:

1. A device for connecting two rigid tubular objects, comprising:

a male part and a female part, which are interconnectable, the female part including a sleeve which at one of its ends is at least one of connected to and constitutes an integral part of one of said objects and which at its other end is provided with at least one recess, the male part including a tube portion which at one of its ends is at least one of connected to and constitutes an integral part of the other of said objects and at its other end in its outer wall is provided with a transverse edge which is formed by an indentation arranged in the outer wall of the male part; and a sleeve-shaped element being arranged to be placed between the parts when inserting the male part into the female part, the element being provided with at least one resilient tongue with a first means for resiliently engaging the recess of the female part when inserting the element into the female part, and a second means for resiliently snapping into place behind the transverse edge of the male part when inserting the male part into the element, the resilient tongue allowing separation of the female part and the male part by turning the element relative to the male part to a position where the second means of the resilient tongue is placed radially outside the transverse edge of the male part, the resilient tongue, in turning for separation, with a portion in the recess of the female part being raised radially outside the transverse edge of the male part.

2. A device as claimed in claim 1, wherein the second means of the resilient tongue includes a stopping edge extending inwards from the inner wall thereof.

3. A device as claimed in claim 1, wherein the first means of the resilient tongue includes a stop lug projecting from the outer wall thereof.

4. A device as claimed in claim 3, wherein the element at one of its outer ends is provided with first abutting means for abutting against the mouth of the sleeve when the stop lug of the resilient tongue engages the recess of the female part.

5. A device as claimed in claim 4, wherein second abutting means is arranged on the male part at a greater distance from the other end thereof than its transverse edge, and wherein said second abutting means is for abutting against the first abutting means of the element when the stopping edge of the resilient tongue abuts against the transverse edge of the male part.

6. A device as claimed in claim 5, wherein the outer diameter of the male part adjacent to a portion between its other end and the second abutting means is somewhat smaller than both the inner diameter of the element and the inner diameter of the remaining portion of the sleeve, the length of this portion exceeds the length of the mouth portion of the female part, resulting in said other end of the male part extending a distance into the remaining portion of the sleeve past said opposite outer end of the element when the second abutting means of the male part abuts against the first abutting means of the element.

7. A device as claimed in claim 6, wherein at least one O-ring is arranged in the transition between the mouth portion and the remaining portion of the sleeve so as to sealingly abut against the inside of the sleeve and against the outer wall of the male part.

8. A device as claimed in claim 1, wherein said portion in the recess of the female part is a lug with a slope on which the resilient tongue runs so that the resilient tongue is disengaged from the transverse edge of the male part when releasing the male part by turning of the element.

9. A device as claimed in claim 1, wherein said portion in the recess of the female part is a groove with a slope, in which the tip of the resilient tongue runs so that the resilient tongue is disengaged from the transverse edge of the male part when releasing the male part by turning of the element.

10. A device as claimed in claim 1, wherein the transverse edge of the male part fully encloses the male part.

* * * * *